United States Patent
Young et al.

(10) Patent No.: US 10,951,157 B1
(45) Date of Patent: Mar. 16, 2021

(54) PANEL MOUNTING DEVICE WITH ADJUSTABLE HEIGHT MECHANISM

(71) Applicants: Jonathan W. Young, Troutville, VA (US); Randall Hatch, Athens, OH (US)

(72) Inventors: Jonathan W. Young, Troutville, VA (US); Randall Hatch, Athens, OH (US)

( * ) Notice: Subject to any disclaimer, the term of this patent is extended or adjusted under 35 U.S.C. 154(b) by 0 days.

(21) Appl. No.: 16/794,843

(22) Filed: Feb. 19, 2020

Related U.S. Application Data

(60) Provisional application No. 62/807,555, filed on Feb. 19, 2019.

(51) Int. Cl.
| | | |
|---|---|---|
| *H02S 20/23* | (2014.01) | |
| *F24S 25/61* | (2018.01) | |
| *H02S 30/10* | (2014.01) | |
| *H02S 20/30* | (2014.01) | |
| *F24S 25/60* | (2018.01) | |

(52) U.S. Cl.
CPC ............. *H02S 20/23* (2014.12); *F24S 25/61* (2018.05); *H02S 20/30* (2014.12); *H02S 30/10* (2014.12); *F24S 2025/6003* (2018.05)

(58) Field of Classification Search
CPC .......... H02S 20/23; H02S 20/30; H02S 30/10; F24S 25/61; F24S 2025/6003; F16B 5/025; F16B 5/0685
See application file for complete search history.

(56) References Cited

U.S. PATENT DOCUMENTS

| | | | |
|---|---|---|---|
| 8,176,693 | B2 | 5/2012 | Abbott et al. |
| 8,938,932 | B1 * | 1/2015 | Wentworth ............ H02S 20/23 |
| | | | 52/747.1 |
| 9,231,517 | B2 | 1/2016 | West et al. |
| 9,800,200 | B2 * | 10/2017 | Higuchi ................. F24S 25/20 |
| 9,806,668 | B2 | 10/2017 | Johansen et al. |
| 9,813,013 | B2 * | 11/2017 | McPheeters ........... H02S 20/30 |
| 9,985,575 | B2 * | 5/2018 | Stearns ................... F24S 25/60 |
| 10,027,276 | B2 | 7/2018 | Almy et al. |
| 10,090,800 | B2 | 10/2018 | McPheeters et al. |
| 10,097,132 | B2 | 10/2018 | Stearns et al. |
| 10,312,853 | B2 * | 6/2019 | MacRostie ............. F24S 25/61 |
| 10,605,282 | B1 * | 3/2020 | Young .................. F16B 5/0685 |
| 2011/0260027 | A1 * | 10/2011 | Farnham, Jr. ......... F24S 25/636 |
| | | | 248/309.1 |

(Continued)

*Primary Examiner* — Adriana Figueroa
(74) *Attorney, Agent, or Firm* — Robert R. Lech; Lech Law, LLC

(57) ABSTRACT

A panel mounting device includes a mounting base with an attachment base plate for securing the base to a structure. The attachment base includes upright substantially parallel opposed compression walls extending from the base plate, wherein each compression wall includes a first outer surface and a second inner surface. The second inner surface of each compression wall includes a series of parallel ridges. The device further includes a securement rail device having a pair of relatively parallel primary exterior walls. The primary exterior walls include parallel ridges designed to releasably mate with the parallel ridges on the inner surfaces of each compression wall to releasably secure the securement rail device between the second inner surfaces of each of the parallel opposed compression walls, such that the securement rail device can be secured to the mounting base at different distances from the attachment base plate.

12 Claims, 7 Drawing Sheets

(56) References Cited

U.S. PATENT DOCUMENTS

2015/0129517 A1* 5/2015 Wildes ................ F24S 25/632
 211/41.1
2016/0268958 A1* 9/2016 Wildes ................ F24S 25/70

* cited by examiner

PANEL MOUNTING DEVICE WITH ADJUSTABLE HEIGHT MECHANISM

CROSS-REFERENCE TO RELATE APPLICATIONS

The present application claims priority to U.S. Provisional Patent Application No. 62/807,555, filed Feb. 19, 2019, the content of which is incorporated herein by reference in its entirety.

FIELD OF THE INVENTION

The present invention relates to mounting devices and, more particularly, to mounting devices for securing panels such as photovoltaic and solar panels, to a surface, such as a roof top surface.

BACKGROUND

Panel mounting devices and systems are well known. Such mounting devices and systems may be used to mount an array or matrix of panels, including tiles, video display panels, and photovoltaic (solar) panels. Typical mounting devices typically include two parts, a mounting base and a securement rail. The mounting base is secured to the structure on which the panel or the like will be mounted, such as a roof top. The base includes a device for securing the rail. The rail includes a device for securing a portion of the panel to the rail. There are a variety of ways to secure the rail to the base. For example, U.S. Pat. No. 9,806,668 discloses a rail support bracket which includes ridges to directly engage both sides of the rail. However, while the ridges may accommodate axial adjustment of the rail, the ridges do not provide for any vertical adjustment of the rail. U.S. Pat. No. 9,813,013 discloses solar panel installation systems that purportedly reduce or eliminate the need for large, costly rails for mounting solar panels on an installation surface. The '013 Patent discloses an L-bracket with ridges that could be used for height adjustment, however, the disclosed bracket does not clamp directly onto a rail. Further, the bracket does not support the rail on both sides thereby weakening the structure. U.S. Pat. No. 10,090,800 discloses a solar panel installation system for mounting solar panels on an installation surface. The systems may include an array of framed solar modules supported above an installation surface using a number of height-adjustable base members. Adjacent solar modules in the array may be coupled to one another at or near their corners using module links that can structurally couple the frames of the adjacent solar modules together. The '800 patent references an L-bracket that attaches to a support element. Both the L-bracket and the support element have ridges that allow for vertical adjustment. While the ridges of L-bracket may be used for height adjustment, the L-Bracket does not clamp directly onto a rail. The disclosed L-Bracket also fails to provide support on both sides.

Thus, the concept of a panel mounting device using ridges of the wall to connect a rail is fairly well known. However, the prior art mounting systems are deficient as no secure mounting system utilizes two compression walls, each with securement ridges.

SUMMARY OF THE INVENTION

The present invention is a panel mounting device comprising a mounting base comprising an attachment base plate for securing the base to a structure, and upright substantially parallel opposed compression walls extending from the base plate, wherein each compression wall includes a first outer surface and a second inner surface, wherein the second inner surface of each compression wall comprises a series of parallel ridges; and a securement rail device having a pair of relatively parallel primary exterior walls, wherein the primary exterior walls further comprises a series of parallel ridges designed to releasably mate with the parallel ridges on the inner surfaces of each compression wall, wherein the securement rail device is adapted to be releasably secured between the second inner surfaces of each of the parallel opposed compression walls, such that the securement rail device can be secured to the mounting base at different distances from the attachment base plate.

In another embodiment, the present invention is a panel mounting device comprising a mounting base comprising an attachment base plate for securing the base to a structure, and upright substantially parallel opposed compression walls extending from the base plate, wherein each compression wall includes a first outer surface and a second inner surface, wherein the second inner surface of each compression wall comprises a series of parallel ridges; and a first securement rail device and a second securement rail device, each of the second and first securement rail devices having a pair of relatively parallel primary exterior walls, wherein the primary exterior walls further comprise a series of parallel ridges designed to releasably mate with the parallel ridges on the inner surfaces of each compression wall, wherein an end of each of the first securement rail device and the second securement rail device is adapted to be releasably secured between the second inner surfaces of each of the parallel opposed compression walls of the mounting base, such that each securement rail device can be secured to the mounting base at different distances from the attachment base plate, wherein the end of the first securement rail abuts the end of the second securement rail within the inner surfaces of each of the parallel opposed compression walls of the mounting device.

Advantageously, the present invention provides a system for clamping a rail device directly to both sides of the base walls to enhance the securement of the rail device to the base and provides ridges to easily change the vertical height of the rail device with respect to the base without compromising the stability of the entire system by fitting the rail device within the two walls of the base, i.e., between two vertical compression walls. The rail device is therefore sandwiched between the two base walls. Further, the height of the rail device can be adjusted with respect to the base. The mating operation of the interacting ridges of the rail device and base provides a strong connection between the rail device and the base.

The entire system adds strength to the clamping system by providing two walls on the base. Further the height of the rail device can be adjusted to the desired position through the temporary mating with the base prior to releasably affixing the rail device to the base. This height adjustment advantage is achieved without the need to manually hold the rail device at the desired height position while releasably affixing the rail device to the base.

Further, the present invention provides a system for externally splicing the ends of two rail devices within the base, thereby creating a longer rail device. This allows the base to not only attach the rail to the surface but also allows the base to elongate the end of a rail device by abutting opposing ends of two rail devices together and splicing them within the base. This eliminates the need for internal splicing devices, simplifies the installation process, and reduces the weight on the surface to which the device is attached.

The objects and advantages of the invention will appear more fully from the following detailed description of the preferred embodiment of the invention made in conjunction with the accompanying drawings.

DETAILED DESCRIPTION OF THE INVENTION

Figure 1:
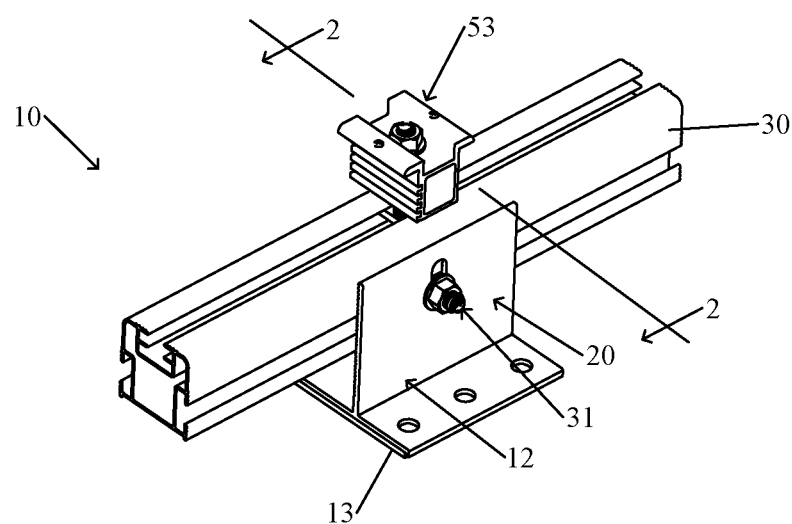
FIG. 1 is a perspective view of the panel mounting device of the present invention.

The present invention is an assembly 10 for mounting panels, such as photovoltaic panels.

The assembly includes a base 12, a rail device 30 and a fastener 31 for securing the rail device to the base.

The base 12 includes an attachment plate 13 and two perpendicularly arranged opposing walls 14, 16 within which the rail device 30 may be installed. The opposing walls 14, 16 include outer surfaces 18, 20 and inner surfaces 22, 24.

The opposing walls 14, 16 comprise multiple parallel ridges 26 on the inner surface 22 and similar multiple parallel ridges 28 on inner surface 24.

The design of the base 12 can include a number of embodiments. For example, as illustrated in FIG. 1, the opposing walls 14 and 16 of the base 12 may each include corresponding vertically elongated openings 15 and 17 where the vertical distance of the opening is greater than the horizontal distance of the opening. The openings 15 and 17 allow a fastener 31 to pass through the corresponding openings 15 and 17 and allow a rail device 30 to be removably affixed to the base 12 at varying heights along the opposing walls 14 and 16. By tightening the fastener 31, the opposing walls 14 and 16 are further compressed against the rail device 30. Providing holes 88 along the length of the rail device 30 allows the rail to be affixed to the base with a fastener 31 at various points along the length of the rail device.

Additionally, in some embodiments, the rail device 30 may be releasably affixed to the base 12 with a fastener 31 without the need for the fastener 31 to pass through holes 88 in the rail device 30. The openings 15 and 17 for the fastener 31 can be positioned on the opposing walls 14 and 16 of the base such that the fastener 31 can be tightened, compressing the opposing walls 14 and 16 while not requiring the fastener to pass through the body of the rail device 30. For example, the opposing walls 14 and 16 could be sufficiently tall such that the fastener can pass over the top wall 47 of the rail device 30. In another example, illustrated in FIG. 11, the end of the rail device might be positioned in the base 12 such that the end is not inserted into the base past the point where the fastener 31 connects through the base 12, thereby allowing the opposing walls 14 and 16 to be compressed further around the rail device 30 without the need for the fastener 31 to pass through the rail device 30.

Figure 9:
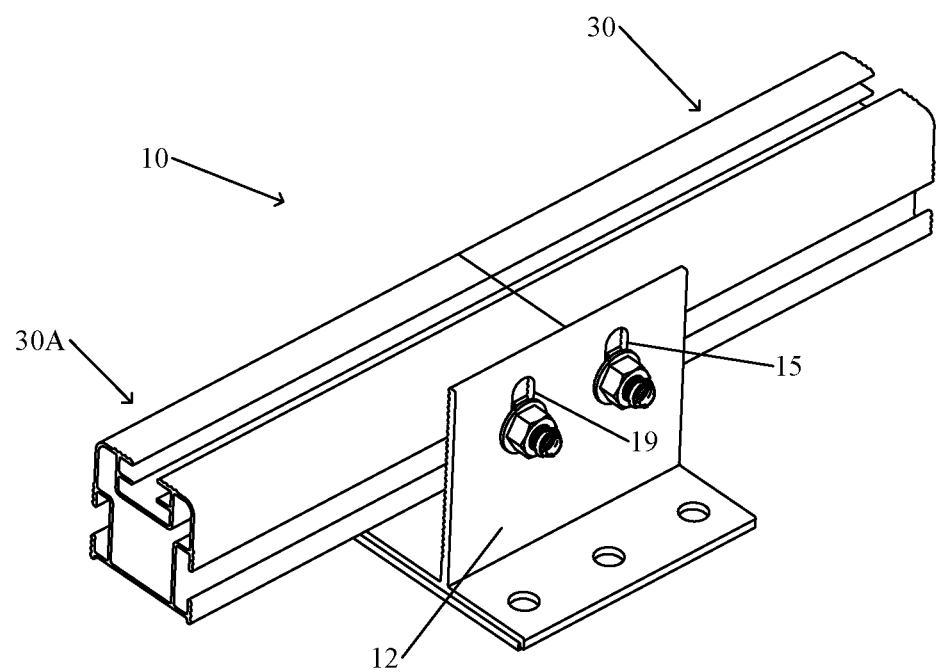
FIG. 9 is a perspective view of another embodiment of the panel mounting device of the present invention where the base is an external splice for two rail devices.
Figure 10:
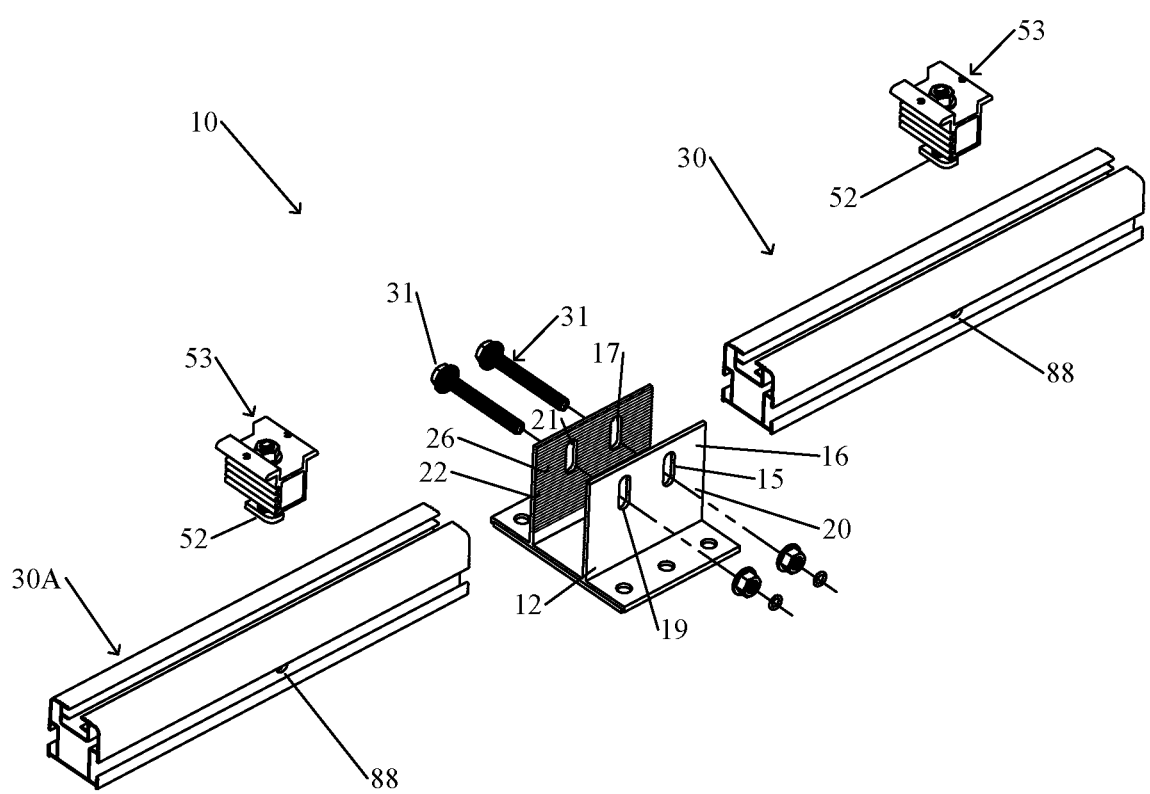
FIG. 10 is an exploded perspective view of the device of FIG. 9.
Figure 11:
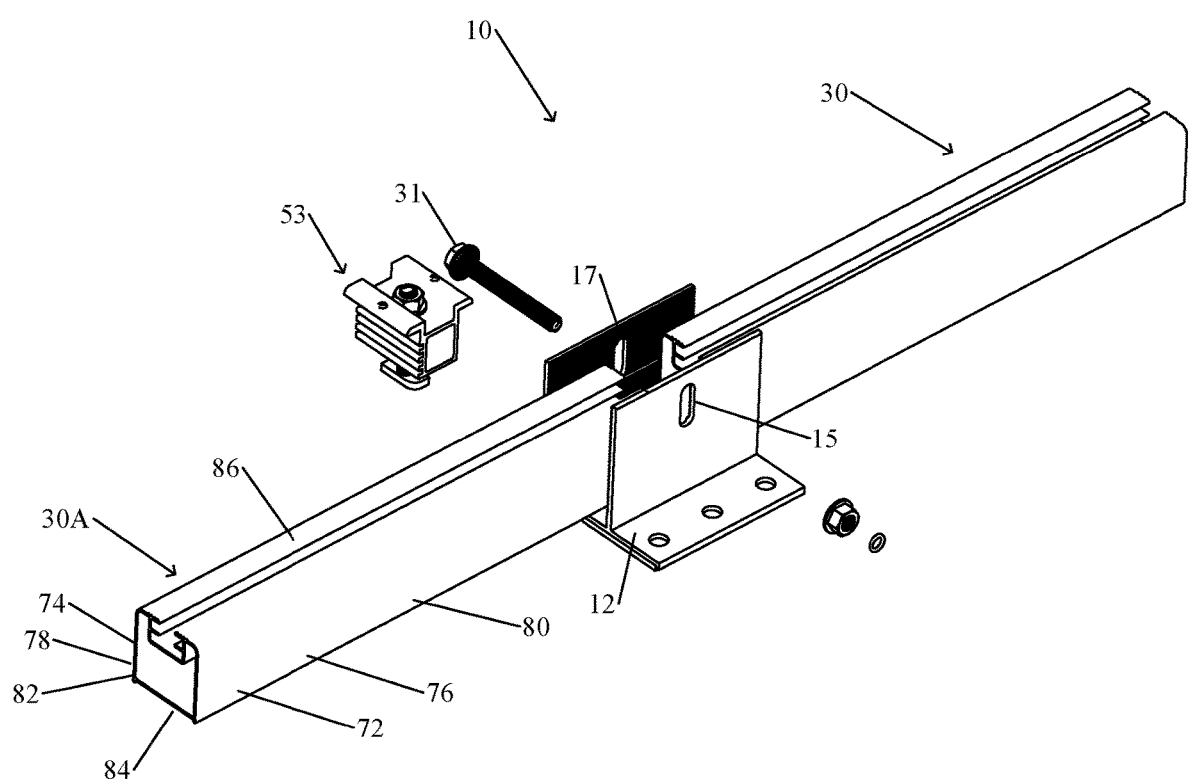
FIG. 11 is a perspective view of another embodiment of the panel mounting device of the present invention where the base is an external splice for two rail devices and another embodiment for the rail device of the panel mounting device

In another example, as illustrated in FIGS. 9 and 10, the opposing walls 14 and 16 of the base 12 may each include two or more corresponding vertical extended openings 15, 17, 19, and 21, where the vertical distance of the openings are greater than the horizontal distance of the openings. The openings 15, 17, 19, and 21 allow fasteners 31 to pass through the corresponding sets of openings (15 to 17 and 19 to 21) and allow for a rail device 30 to be removably affixed at multiple points to the base 12 at varying heights along the opposing walls 14 and 16. The multiple sets of corresponding openings also allows the base 12 to act as an external splice enabling the ends of two different rail devices 30 and 30A to be removably affixed to one base 12 thereby extending the length of the rail device 30. This embodiment allows the base 12 to both attach the rail device 30 to a surface and splice two rail devices 30 and 30A. As illustrated in FIG. 11, the external splicing ability of the base 12 can also be accomplished with a single set of vertically elongated openings 15 and 17, by inserting opposing ends of rail devices 30 and 30A up to the fastener 31 and tightening the fastener 31 to further compress the opposing walls 14 and 16 against the end of both rail devices 30 and 30A. It should be understood that the above are merely examples of how the based is designed to releasably attach to the rail device and should not be limiting.

The rail device 30 can be any structural profile used to span distances between bases 12 and is configured to receive clamp assemblies 53. The design of the rail device 30 can include a number of embodiments including tubes, rails, pipes, supports, rods, beams, etc. Preferably, the rail device 30 is made out of aluminum or steel. In embodiments where all rail devices 30 installed are made out of aluminum or steel, it is possible to take advantage of the use of aluminum and steel such that the rail devices 30 can be used to create a bonding path to electrically bond the device 10. As illustrated in FIG. 11, a base embodiment of the rail device 30 comprises outer walls 72 and 74, a bottom surface 84, and a top surface 86. The outer walls 72 and 74 having exterior surfaces 76 and 78. Similar to the inner surfaces 22 and 24 of the base 12, the exterior surfaces 76 and 78 each comprise multiple parallel ridges 80 and 82. The top surface 86 is configured to receive at least one clamp assembly 53.

In another embodiment, as illustrated in FIGS. 1-3 and 5, the rail device 30 comprises upper outer walls 32, 34 having exterior surfaces 36, 38. Similar to the inner surfaces 22, 24 of the base 12, the exterior surfaces 36, 38 each comprise multiple parallel ridges 40, 42. The rail device 30 further comprises lower outer walls 35, 37 each having ridges 39, 41, a bottom surface 45, and a split top surface 47. The split top surface 47 includes a series of ridges 49, 51, which purpose is to assist in seating clamp assembly 53, illustrated in FIGS. 1-3. In addition, the ridges 49, 51 can be used to assist in mating any other device with corresponding ridges to the split top surface 47 of the rail device 30. For example, a second rail device 30 with corresponding ridges on the bottom surface 45 could be seated on top of the existing rail device 30. It is sometimes necessary to add a second rail device 30 either parallel to or perpendicular to the existing rail device 30. The ridges 49, 51 add an element of friction to better seat the second rail device 30 and, in embodiments where the rail devices 30 are made of steel or aluminum, provide a bonding path to electrically bond the device 10.

Each of the multiple parallel ridges 26, 28, 40, 42, 39, 41, 80, 82 are formed of "peaks" and "valleys" enabling the base ridges 26, 28 to correspondingly mate with the rail device ridges 39, 40, 41, and 42 or 80 and 82 of the base embodiment of the rail device 30.

The ridges 26, 28 of the opposing base walls 14, 16 cooperate with ridges 39, 40, 41, 42 (or 80 and 82) to form an adjustable mating surface on corresponding outer walls 32, 34, 35, 37 of the rail device 30 (or outer walls 72 and 74 of the base embodiment of the rail device 30) to temporarily secure the rail device 30 to the base 12 without the need for a fastener and without the need to manually hold the rail device 30 at the desired height until it is secured to the base 12. The opposing side walls 14, 16 are preferably angled slightly inwards to assist in compressing the outer walls 32, 34, 35, 37 (or outer walls 72 and 74 of the base embodiment of the rail device 30) against the inner surface 22, 24 of the opposing side walls 14, 16, thus assisting in temporarily securing the side walls 14, 16 to the rail device 30.

The ridges 39, 41, 40, 42 (or 80 and 82 of the base embodiment) further enable vertical positioning of the rail device 30, i.e., height or distance from the attachment plate 13, as the rail device 30 can be adjustably mounted at various heights along the walls 14, 16 of the base 12. The ridges allow the height of the rail 30 to be temporarily secured without the need for a fastener 31 and without the need to manually hold the rail device 30 at the desired height while affixing it to the base 12.

Additionally, when opposing walls 14 and 16 of the base 12 are affixed to the rail device 30 using a fastener 31, the ridges 39, 41, 40, 42 (or 80 and 82 of the base embodiment) mated with ridges 26 and 28 cause the rail device 30 to be more securely fastened to the base 12. In embodiments where a fastener 31 is used to affix rail devices 30 to the base 12, the outer walls 72 and 74 of the rail device 30 will have holes 88 bore through the width of the rail device 30 spanning from one outer wall 72 to the opposing outer wall 74 such that the fastener 31 can pass through the body of the rail device 30. The holes 88 can be positioned at any necessary or desired point along the length of the rail device 30. Optionally, the hole 88 can be placed incrementally along the length of the rail device 30 or they can be placed as needed along the length of the rail device 30.

Figure 2:
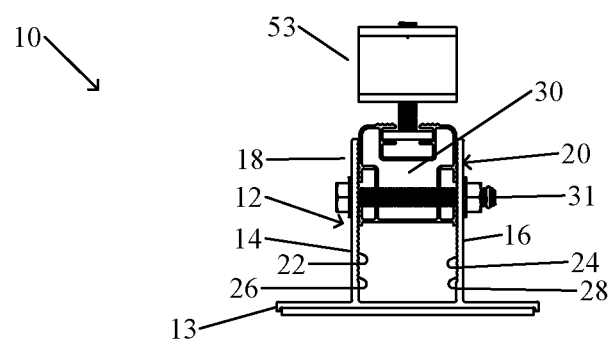
FIG. 2 is a cross-sectional view of the device of FIG. 1, taken at lines 2-2 of FIG. 1.
Figure 3:
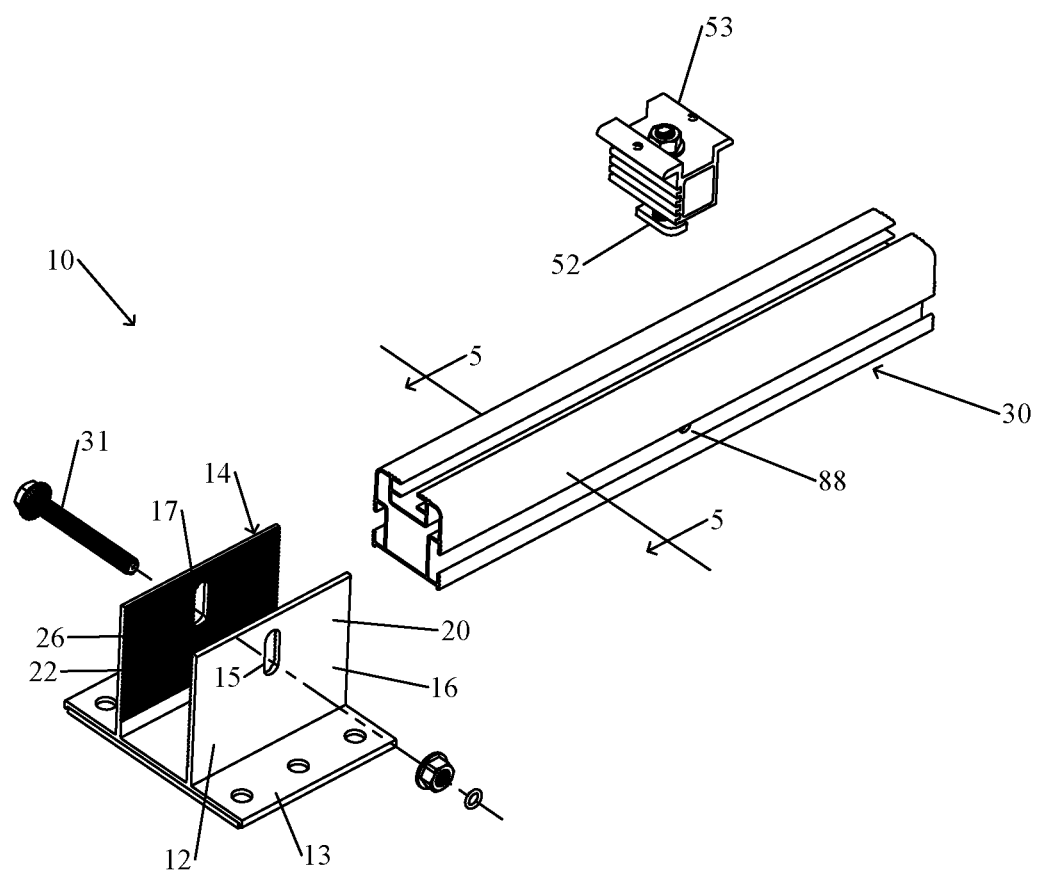
FIG. 3 is an exploded perspective view of the device of FIG. 1.
Figure 4:
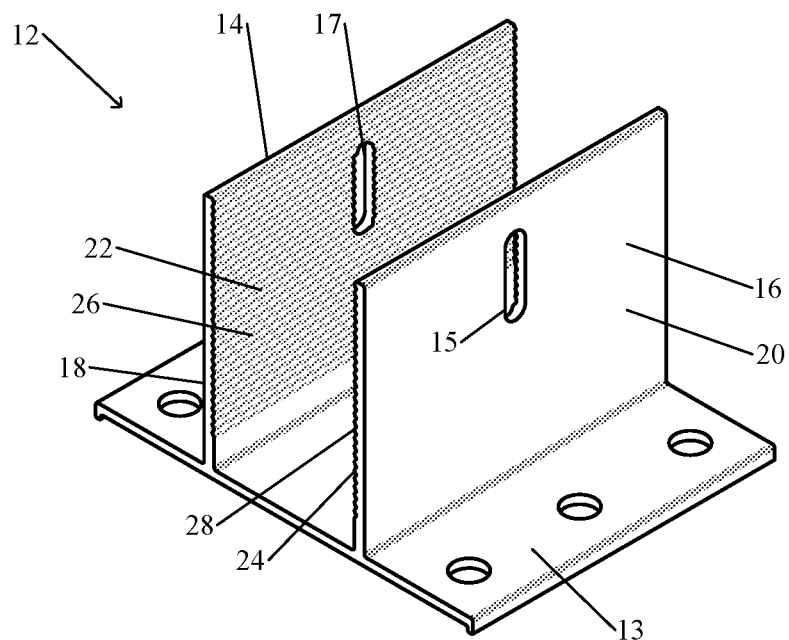
FIG. 4 is a perspective view of the base of the panel mounting device.
Figure 5:
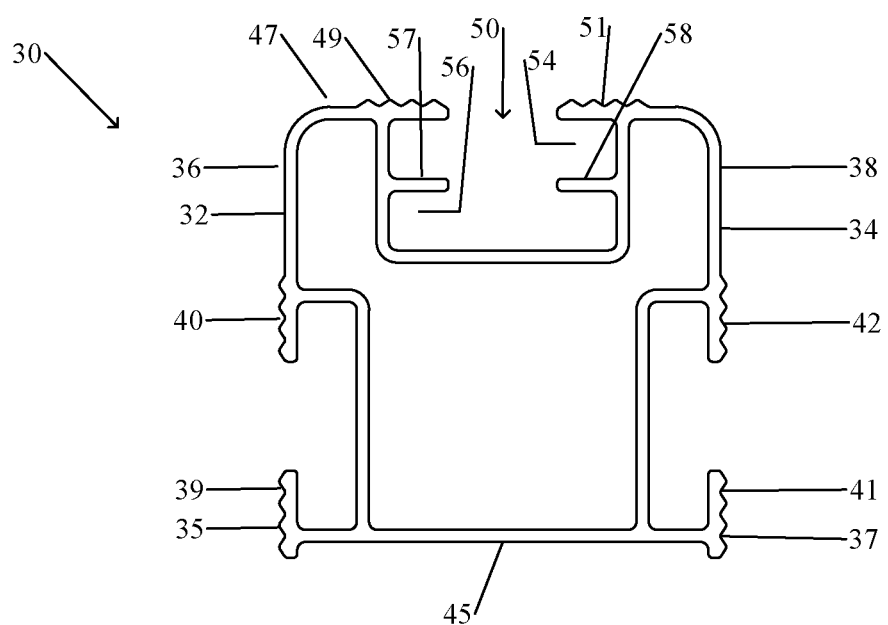
FIG. 5 is a cross-sectional view of the rail device of the patent mounting device taken at lines 5-5 of FIG. 3.

One embodiment of the clamp 53 is illustrated in FIGS. 1-3. As illustrated in FIGS. 1-3, the clamp 53 is designed to be seated on the split top surface 47 of the embodiment of the rail device 30 also illustrated in FIGS. 1-3. The clamp 53 is secured to the rail device 30 by T-bolt 52, the head of which is placed in slot 50. Slot 50 is specifically formed within the rail device 30. Slot 50 allows for accommodating T-bolts 52 of varying lengths and allows for the securement of modules and panels of different thicknesses to the rail device 30. As illustrated in FIG. 5, slot 50 is bifurcated into an upper slot 54 and a lower slot 56. The upper and lower slots 54, 56 are separated by partial walls 57, 58, which form a channel 59 for allowing passage of the shaft of the T-bolt 52. The clamp 53 is secured to the rail device 30 by tightening the T-bolt 52 in a manner known to the art. The split partial walls 57 and 58 allow for the T-bolt to be secured either in the upper slot 54 or the lower slot 56, which allows the clamp 53 to accommodate a variety of panel thicknesses. Reference is made to U.S. patent application Ser. No. 16/155,834 in the name of Jonathan Young and entitled PANEL MOUNTING DEVICE, which is incorporated herein in its entirety for a description of the panel mounting device and clamp. It should be understood that the above is merely one embodiment of the clamp 53 and should not be limiting. The clamp 53 can be any device configured to affix to the top surface 86 or 47 of the rail device 30 and configured to secure a panel/module to the rail device 30. It should further be understood that the T-bolt 52 is one embodiment of a fastener for the clamp 53 and should not be limiting. The fastener for the clamp 52 can be any fastener capable of releasably attaching the clamp to the top surface 86 or 47 of the rail device 30.

Figures 6, 7, 8:
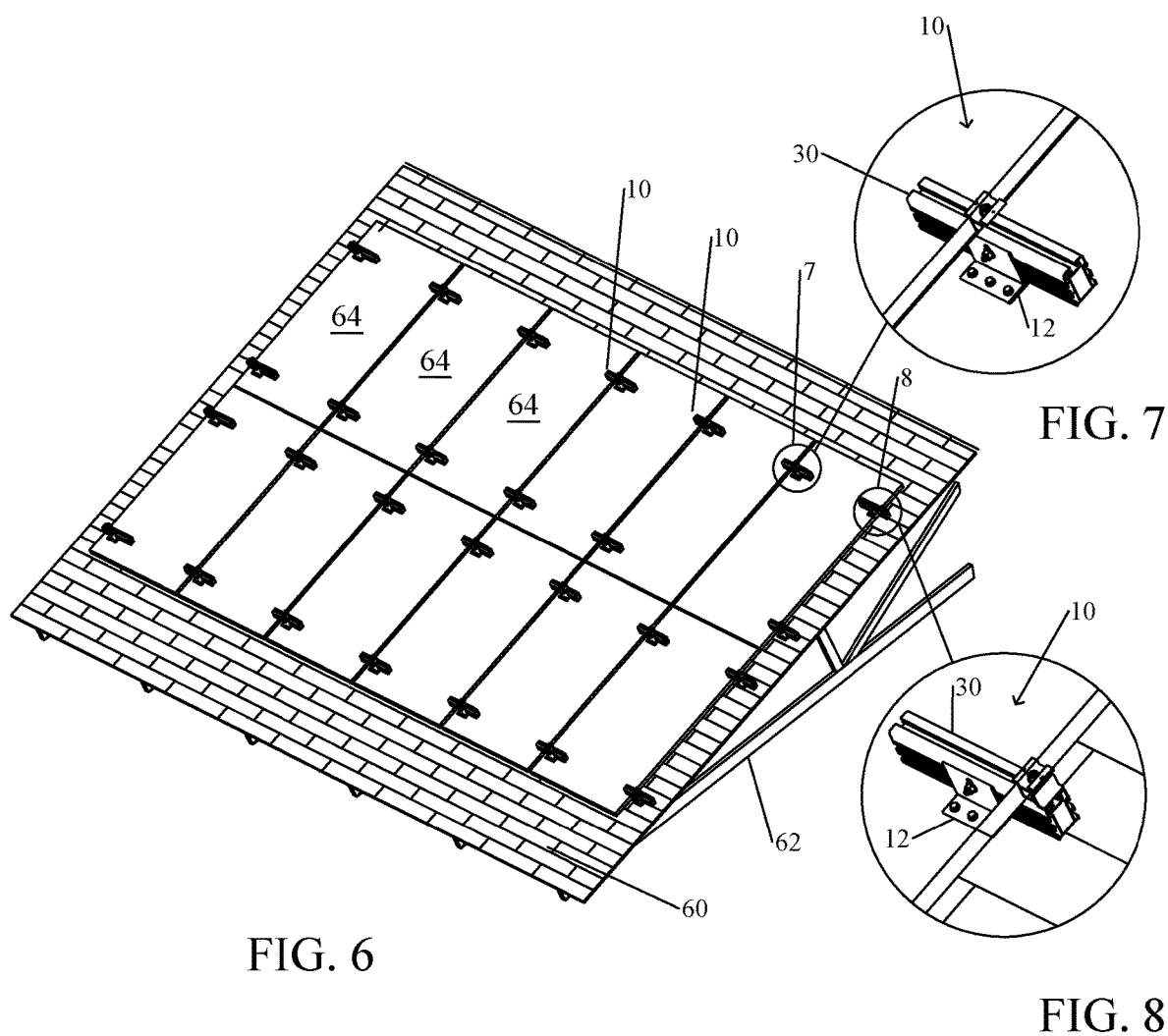
FIG. 6 is a perspective view of a roof section of the building illustrating the placement of the panel mounting devices with respect to the roof and the panels.
FIG. 7 is an enlarged portion of section 7 of FIG. 6.
FIG. 8 is an enlarged portion of section 8 of FIG. 6.

Referring now to FIGS. 6-8, there is shown an exemplary view of the manner of utilizing the assembly 10 on the roof 60 of a building, wherein the roof 60 includes a wood-frame truss 62. Referring to FIGS. 7 and 8, the base 12 and rail device 30 are readily apparent wherein the clamp 53 is used to secure a panel 64, such as a solar panel, to the rail devices 30 which, accordingly, is mounted to the roof 60. It should be noted that FIGS. 6-8 are merely examples of how the assembly 10 can be mounted and should not be considered limiting. The assembly 10 can be attached to any wood structure or steel structure. The assembly 10 can further be attached to any roofing structural member, including, for example, steel purlins. Advantageously, the assembly 10 can be used to mount side-by-side panels 64, as illustrated in FIG. 7, or as an end mount, as illustrated in FIG. 8. As discussed above and illustrated in FIGS. 9-11, the base 12 of the assembly 10 can also be used as an external splice to join the ends of two rail devices 30 and 30A, thereby extending the length of the rail devices 30 and 30A. The ability for the base 12 to externally splice rail devices 30 reduces the need for internal splicing devices, simplifies the installation process, and reduces the weight of the system on the surface/roof.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A panel mounting device comprising:
    a. a mounting base comprising an attachment base plate for securing the base to a structure, and upright opposed compression walls extending from the base plate, wherein each compression wall includes a first outer surface and a second inner surface, wherein the second inner surface of each compression wall comprises a series of parallel ridges; and
    b. a securement rail device having a pair of relatively parallel primary exterior walls, wherein the primary exterior walls further comprises a series of parallel ridges designed to releasably mate with the parallel ridges on the inner surfaces of each compression wall, wherein the securement rail device is adapted to be releasably secured between the second inner surfaces of each of the parallel opposed compression walls, such that the securement rail device can be secured to the mounting base at different distances from the attachment base plate;
    wherein the opposed compression walls are angled slightly inwards to assist in compressing the compression walls against the exterior walls of the securement rail device.

2. The device of claim 1 further comprising a fastener for securing the securement rail device to the mounting base.

3. The device of claim 1 wherein the securement rail device further comprises a pair of secondary exterior walls, wherein the secondary exterior walls comprise a series of parallel ridges further designed to releasably mate with the parallel ridges on the inner surfaces of each compression wall.

4. The device of claim 1 wherein the securement rail device further comprises a bottom surface and a split top surface, wherein the split top surface comprises a series of parallel ridges for assisting in seating a clamp assembly.

5. The device of claim 4 further comprising an attachment clamp releasably connected to the split top surface of the securement rail device.

6. The device of claim 5 wherein the attachment clamp is releasably secured to the securement rail device by a T-bolt.

7. A panel mounting device comprising:
    a. a mounting base comprising an attachment base plate for securing the base to a structure, and upright opposed compression walls extending from the base plate, wherein each compression wall includes a first outer surface and a second inner surface, wherein the second inner surface of each compression wall comprises a series of parallel ridges; and
    b. a first securement rail device and a second securement rail device, each of the second and first securement rail devices having a pair of relatively parallel primary exterior walls, wherein the primary exterior walls further comprise a series of parallel ridges designed to releasably mate with the parallel ridges on the inner surfaces of each compression wall, wherein an end of each of the first securement rail device and the second securement rail device is adapted to be releasably secured between the second inner surfaces of each of the parallel opposed compression walls of the mounting base, such that each securement rail device can be secured to the mounting base at different distances from the attachment base plate, wherein the end of the first securement rail abuts the end of the second securement rail within the inner surfaces of each of the parallel opposed compression walls of the mounting device;
    wherein the opposed compression walls are angled slightly inwards to assist in compressing the compression walls against the exterior walls of each of the securement rail devices.

8. The device of claim 7 further comprising a first fastener for securing the first securement rail device to the mounting base and a second fastener for securing the second securement rail device to the mounting base.

9. The device of claim 7 wherein each of the securement rail devices further comprises a pair of secondary exterior walls, wherein the secondary exterior walls comprise a series of parallel ridges further designed to releasably mate with the parallel ridges on the inner surfaces of each compression wall.

10. The device of claim 7 wherein each of the securement rail devices further comprises a 30 bottom surface and a split top surface, wherein the split top surface comprises a series of parallel ridges for assisting in seating a clamp assembly.

11. The device of claim 10 further comprising an attachment clamp releasably connected to the split top surface of one of the securement rail devices.

12. The device of claim 11 wherein the attachment clamp is releasably secured to at least one of the securement rail devices by a T-bolt.

* * * * *